(12) United States Patent
Abshire et al.

(10) Patent No.: US 7,982,861 B2
(45) Date of Patent: Jul. 19, 2011

(54) TIME DELAY AND DISTANCE MEASUREMENT

(75) Inventors: James B. Abshire, Clarksville, MD (US); Xiaoli Sun, Clarksville, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 407 days.

(21) Appl. No.: 12/183,820

(22) Filed: Jul. 31, 2008

(65) Prior Publication Data

US 2010/0027602 A1 Feb. 4, 2010

(51) Int. Cl.
*G01C 3/08* (2006.01)
(52) U.S. Cl. ..................................... 356/5.11
(58) Field of Classification Search ......... 356/3.01–28.5
See application file for complete search history.

(56) References Cited

U.S. PATENT DOCUMENTS

| | | |
|---|---|---|
| 5,396,515 A | 3/1995 | Dixon et al. |
| 5,414,729 A | 5/1995 | Fenton |
| 5,781,152 A | 7/1998 | Renard et al. |
| 5,805,200 A | 9/1998 | Counselman, III |
| 5,901,183 A | 5/1999 | Garin et al. |
| 6,005,889 A | 12/1999 | Chung et al. |
| 6,272,189 B1 | 8/2001 | Garin et al. |
| 6,345,068 B1 | 2/2002 | Molev-Shteiman |
| 6,421,006 B1 | 7/2002 | Yakos et al. |
| 6,452,913 B1 | 9/2002 | Proctor, Jr. |
| 6,463,091 B1 | 10/2002 | Zhodzichsky et al. |
| 6,493,378 B1 | 12/2002 | Zhodzishsky et al. |

*Primary Examiner* — Thomas Tarcza
*Assistant Examiner* — Luke Ratcliffe
(74) *Attorney, Agent, or Firm* — Matthew Johnston

(57) ABSTRACT

A method for measuring time delay and distance may include providing an electromagnetic radiation carrier frequency and modulating one or more of amplitude, phase, frequency, polarization, and pointing angle of the carrier frequency with a return to zero (RZ) pseudo random noise (PN) code. The RZ PN code may have a constant bit period and a pulse duration that is less than the bit period. A receiver may detect the electromagnetic radiation and calculate the scattering profile versus time (or range) by computing a cross correlation function between the recorded received signal and a three-state RZ PN code kernel in the receiver. The method also may be used for pulse delay time (i.e., PPM) communications.

25 Claims, 9 Drawing Sheets

TIME DELAY AND DISTANCE MEASUREMENT

ORIGIN OF THE INVENTION

This invention was made by employees of the United States Government and may be manufactured and used by or for the Government for governmental purposes without the payment of any royalties thereon or therefore.

FIELD OF THE INVENTION

The invention relates, in general, to signal processing, and in particular, to time delay and distance measurement, and communications.

BACKGROUND

The accurate measurement of time delay (or range delay) is important for many diverse applications. Most modern telecommunications systems, including cellular telephones, must be synchronized to less than one microsecond (usec). Satellite based radio frequency ranging systems (such as Global Positioning Systems) require time resolutions and synchronizations to less than 50 nanoseconds (nsec). Laser altimeter systems may require time resolutions of 1 nsec or better. New and existing applications in communications and remote sensing may substantially benefit from modulation methods that may reduce timing errors to one nsec or less.

Pseudo random noise (PN) code modulation is a signal type widely used in telecommunications, ranging, and altimetry applications. Presently, amplitude modulated PN coded systems use a pulse modulation pattern with an average 50% duty cycle, where the number of zeros and ones are approximately equal, and the width of the transmitted signal pulses (the "1" pulses) are equal to the bit period. PN code modulation may also be impressed on the phase, frequency, polarization, or pointing direction of the transmitted carrier. For amplitude modulated signals, the transmitter peak power is twice the average power. The receiver's timing resolution is proportional to the bit period divided by the receiver signal to noise ratio (SNR).

In most applications, there is a substantial benefit to improving the time resolution. For a PN coded signal with fixed receiver SNR, one has to increase the bit rate and decrease the bit period to improve the time resolution. For example, one must double the bit frequency to reduce the timing error by a factor of two. Thus, the use of conventional PN codes with a 50% duty cycle locks together many characteristics of the modulation, thereby limiting the capability to optimize performance. For an ex ample of the use of traditional pseudo noise (non-return-to-zero) code modulation in a laser ranging system see "Photon Counting Pseudorandom Noise Code Laser Altimeters", SPIE Advanced Photon Counting Techniques, Paper 6771-23, September 2007, the entire contents of which are incorporated herein by reference.

There are several disadvantages to the fixed 50% duty cycle PN code modulation, as presently used: 1) For amplitude modulated signals, the transmitter peak power is fixed at twice the average power; 2) For amplitude modulated signals, the transmitter duty cycle is fixed at 50%; 3) For a given SNR at the receiver, the timing resolution can be changed only via the PN code's bit frequency or pulse rate; and 4) The duty cycle of the receiver integration time is 100%.

In laser applications using optical receivers, the amount of solar background noise and detector dark noise that is included in measurements is proportional to the duty cycle in the receiver's signal processing system. A 100% duty cycle means that all noise photons in the observation period contribute to the noise floor of the measurement. A reduction in the receiver duty cycle may reduce the impact of the noise (via time gating), may improve the SNR, and, therefore, may improve the timing resolution.

SUMMARY

A method of measuring time delay may include providing and modulating an electromagnetic radiation carrier frequency. At least one of amplitude, phase, frequency, polarization, and pointing angle of the carrier frequency may be modulated with a return to zero (RZ) pseudo random noise (PN) code. The RZ PN code may have a constant bit period, and a pulse duration that is less than the bit period.

The method may include transmitting the modulated electromagnetic radiation, detecting the modulated electromagnetic radiation, extracting modulation from the detected electromagnetic radiation, converting a time record of the detected electromagnetic radiation into a signal processing format, providing an RZ PN code kernel, and computing a cross correlation function between the time record and the RZ PN code kernel.

A transmitter may include an electromagnetic wave generator, a modulator connected to the electromagnetic wave generator, a PN code generator connected to the modulator, and an RZ pulse shaper connected to the modulator. The PN code generator and the RZ pulse shaper may generate RZ PN code having a constant bit period, and a pulse duration that is less than the bit period.

A receiver may include a detector, a multi-channel integrator connected to the detector, and a correlator connected to the multi-channel integrator. The correlator may include an RZ PN code kernel having a constant bit period, and a pulse duration that is less than the bit period.

A time delay measurement device may include an electromagnetic wave generator, a modulator connected to the electromagnetic wave generator, and a PN code generator and RZ pulse shaper connected to the modulator. The PN code generator and the RZ pulse shaper may generate RZ PN code having a constant bit period, and a pulse duration that is less than the bit period.

The time delay measurement device may also include a detector, a multi-channel integrator connected to the detector, and a correlator connected to the multi-channel integrator and to the modulator. The correlator may include a kernel.

Further features and advantages of the invention will become apparent from the following detailed description taken in conjunction with the following drawings.

DETAILED DESCRIPTION

Figure 1:
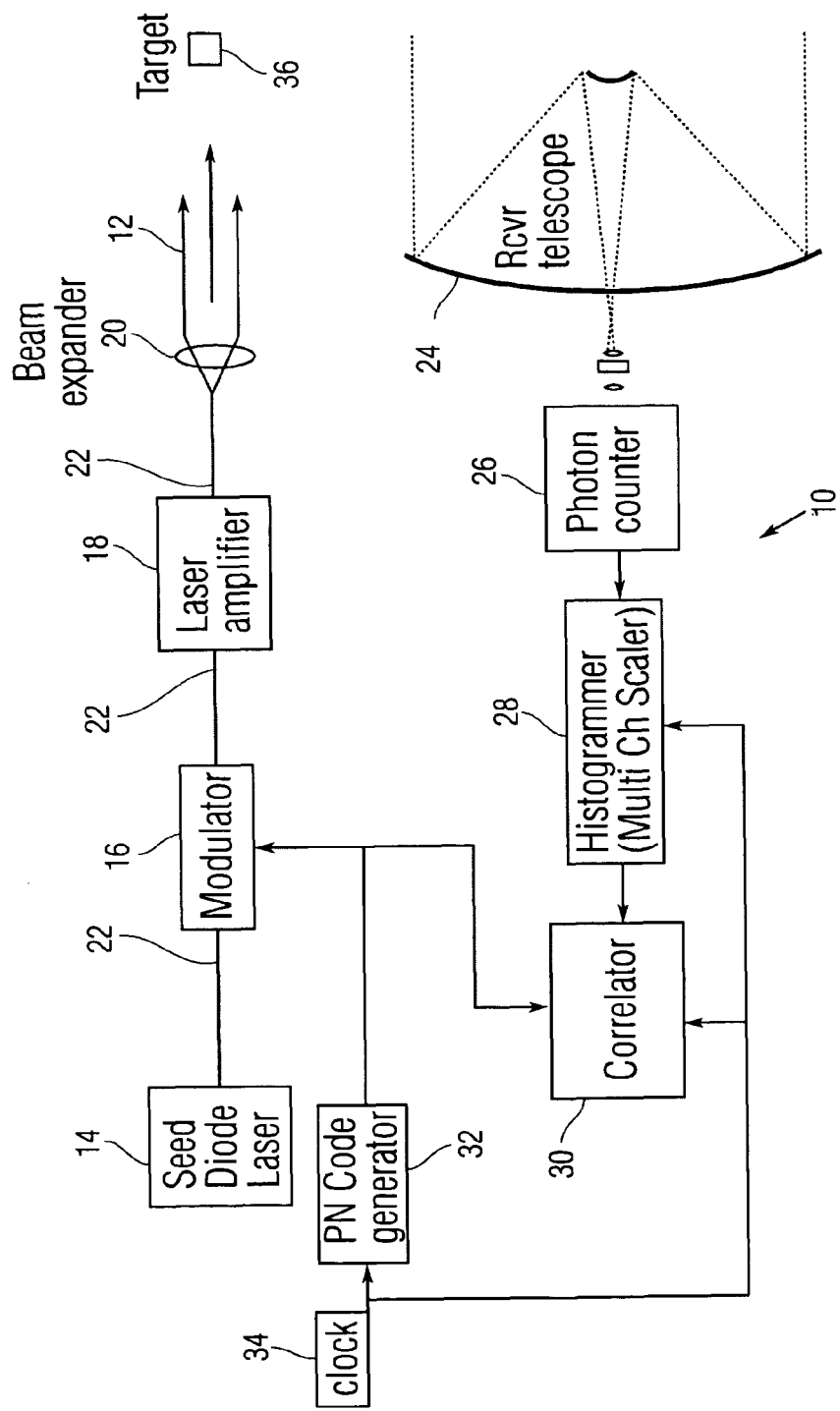
FIG. 1 is a schematic diagram of a known laser altimeter.

In ranging, altimetry, and communications based on pulsed timing, there are several advantages to using narrower signal pulses, that is, pulses of shorter time duration, to carry energy. Narrower pulses have higher bandwidths. The time (or range error) at a given receiver SNR is proportional to the width (and, therefore, inversely proportional to the bandwidth) of the signal pulses. Hence, at a given SNR, one may substantially reduce the time, range, or altimetry error, and improve the time, range, or altimetry resolution, by using narrower signal pulses. In time-gated receivers, the use of narrower signal pulses may also reduce the influence of noise from the scene and from the detector and amplifier system, thereby resulting in a higher SNR for a given transmitted power.

In a time delay measurement device and method, a carrier frequency may be modulated with PN code. The carrier frequency for the PN code modulation may be electromagnetic radiation of any wavelength, such as, for example, radio frequency (RF), microwave, infrared, optical, etc. The PN code modulation may be impressed on the amplitude, phase, frequency, polarization, or pointing angle of the carrier. To date, all applications of PN code modulation have used symmetrical signals, where the width (time duration) of the ones (pulses) are equal to the bit period, and hence to the width of the zeros.

A new time delay measurement device and method may use PN codes and signal processing techniques wherein the widths of the transmitted pulses may be narrower (temporally shorter) than the PN code bit period. The width of the pulses may be constant in a given PN code, but may vary from one PN code to another PN code. The width of the pulses may be set to be any fraction less than 100% of the bit period. By modifying the form of the kernel used in the PN code receiver's cross correlation signal processing, the desirable statistical properties of PN code modulation are maintained.

There are several benefits to the new time delay measurement device and method. The use of narrower transmitted pulses may substantially increase the modulation bandwidth of the transmitted signal. Because a receiver's timing error is inversely proportional to the signal's bandwidth, narrower pulses may allow substantially improved timing (and equivalently, range) resolution with the same receiver SNR.

The use of narrower signal pulses may also introduce a time gating effect into the receiver's signal processing (via the modified kernel). The time gating effect may directly lower the background signal and detector noise, and reduce their impact. The range bin of the receiver's sampling may be much shorter (for example 1-10%) than the PN code bit period. That is, the receiver sampling frequency may be much higher than the frequency of the PN code bits. The narrower correlation function and higher sampling time resolution may permit the correlation function to be calculated with a time resolution that is higher than the PN code bit period. The higher time resolution of the correlation function may allow substantially improved time and range resolution.

In many light detection and ranging (LIDAR) applications, which use optical carrier frequencies, conventional PN codes are used to modulate the carrier power. Modulating the optical power with conventional PN codes results in a transmitted peak The statistical properties of the PN code signal allow the cross correlation function to reproduce the signal backscatter function versus time (and range). The time delay (or range to a reflecting target) is given by the location of the peak in the correlation function. For distributed or multiple targets (and/or when ranging through partially scattering substances, such as smoke or thin fog) within the path of the laser beam, the value of the correlation function at each delay value corresponds to the strength of the effective backscatter at that range.

FIG. 1 is a schematic diagram of a known laser altimeter 10 having an output beam 12 whose optical power is digitally modulated by a conventional 50% duty cycle PN code. The transmitting portion of altimeter 10 may include a laser 14, modulator 16, laser amplifier 18, and beam expander 20, all connected with fibers 22. Alternately, a laser with direct power modulation may be used. The receiving portion of altimeter 10 may include a receiver telescope or lens 24, a photon counting detector 26, histogrammer 28, and correlator 30. A PN code generator 32 may be connected to both the modulator 16 and correlator 30. A clock 34 may be connected to the PN code generator 32, the correlator 30, and the histogrammer 28.

An altimeter 10 may emit a beam 12 of digitally modulated photons toward a target 36. The photons may reflect from scatters in the beam (such as tree and/or ground) and arrive at the receiver with different delay times. The receiver portion of altimeter 10 may synchronously histogram the detected backscattered photons for the needed integration time. The receiver portion then may cross correlate the histogram with a scaled and shifted version of the PN code. The scaled and shifted version of the PN code is called the "kernel." The cross correlation operation yields the backscatter versus time profile of optical scatter in the beam. For a solid target, the cross correlation reproduces the target's impulse response in range (or height for an altimeter), quantized at the time resolution of the PN code.

Figure 2A:
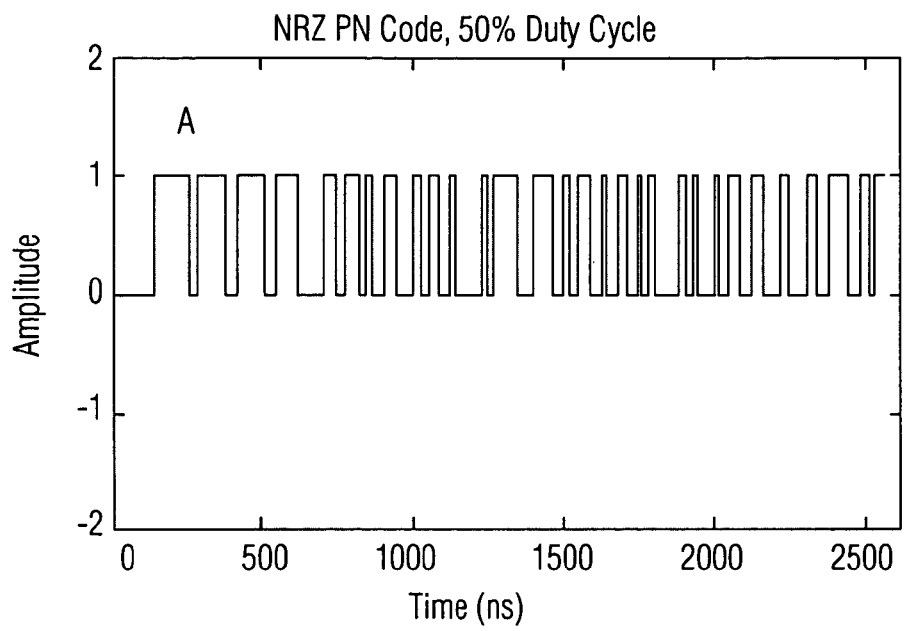
FIGS. 2A-D are waveforms for a 50% duty cycle PN code.
Figure 2B:
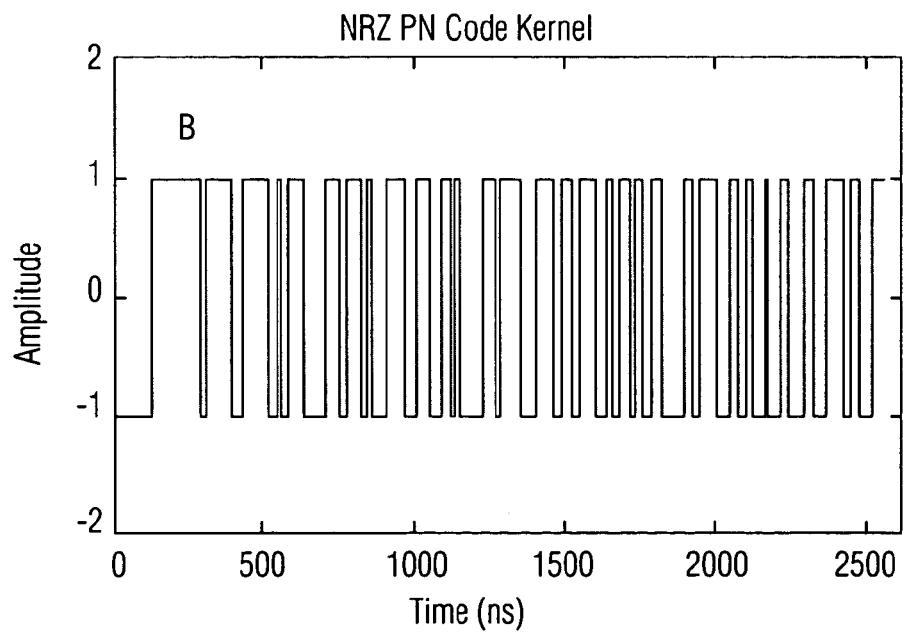

FIG. 2A shows an example of a modulation sequence for a conventional 50% duty cycle PN code. FIG. 2E is an enlarged view of the first part of FIG. 2A. The pulse width or duration is 20 nsec and equals the bit period. FIG. 2B shows the corresponding cross correlation kernel. FIG. 2F is an enlarged view of the first part of FIG. 2B. The kernel in FIG. 2B is created from the PN modulation sequence in FIG. 2A by replicating the +1 bit values and substituting a −1 bit value for each zero bit value of the modulation sequence.

The range resolution of a PN code measurement is proportional to the bit period of the PN code divided by the receiver SNR. Because the conventional PN receiver's duty cycle is 100%, all noise photons detected during the integration time are included in the cross correlation process. For a direct detection optical receiver, the standard deviation of counts for all range bins is the same and is equal to the square root of all signal and noise counts received during the integration time.

Figure 2C:
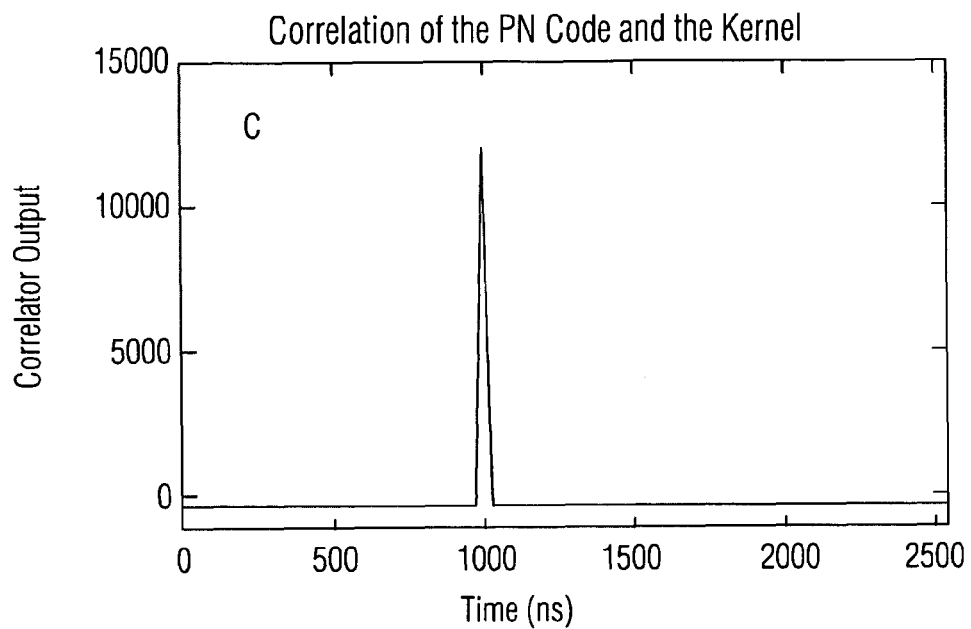
Figure 2D:
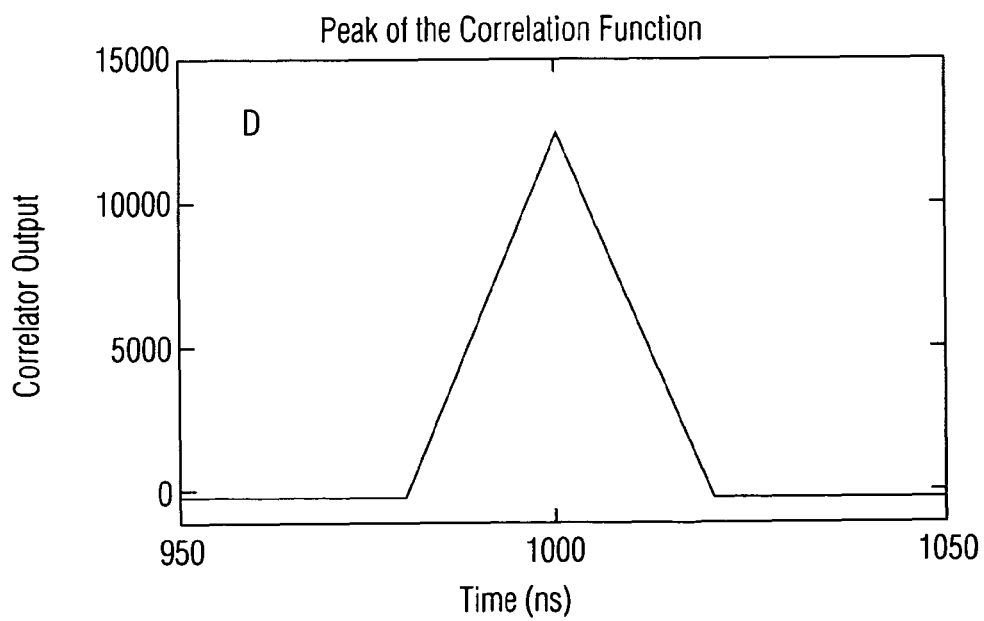
Figure 2E:
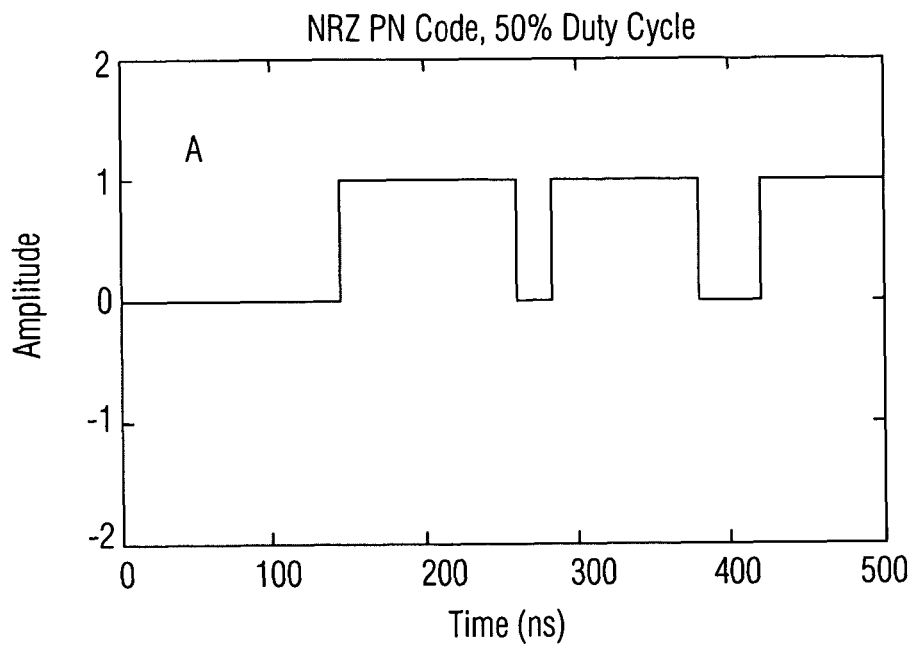
FIG. 2E is an enlarged view of the first part of FIG. 2A.
Figure 2F:
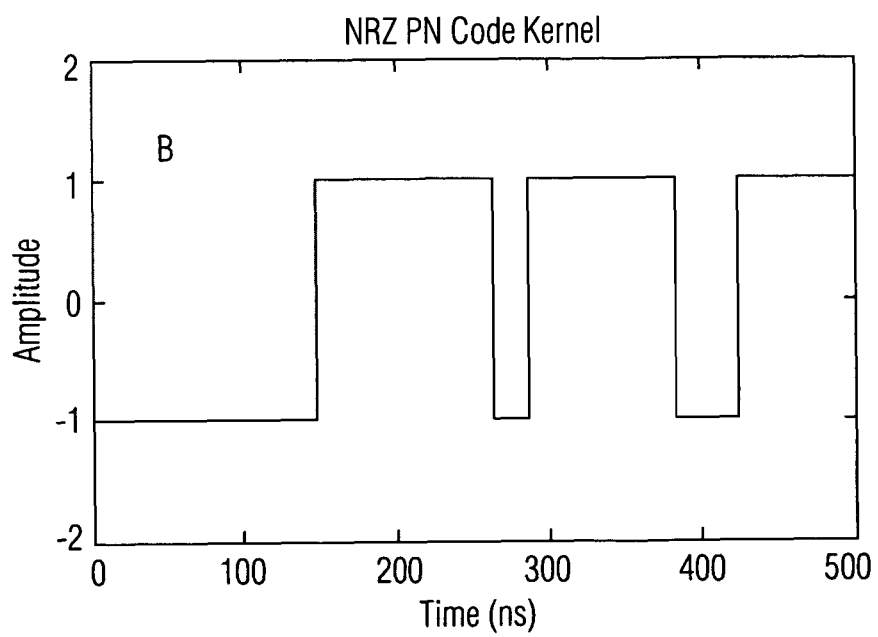
FIG. 2F is an enlarged view of the first part of FIG. 2B.

FIGS. 2C and 2D are coarse and fine views, respectively, of the cross correlation function computed for the waveforms of FIGS. 2A and 2B. In the conventional 50% duty cycle modulation, the correlation function has a full-width half-maximum (FWHM) value equal to the duration of the PN code bit period. In FIGS. 2A and 2B, the bit period is 20 nsec and in FIG. 2D, the FWHM value is 20 nsec.

Figure 3:
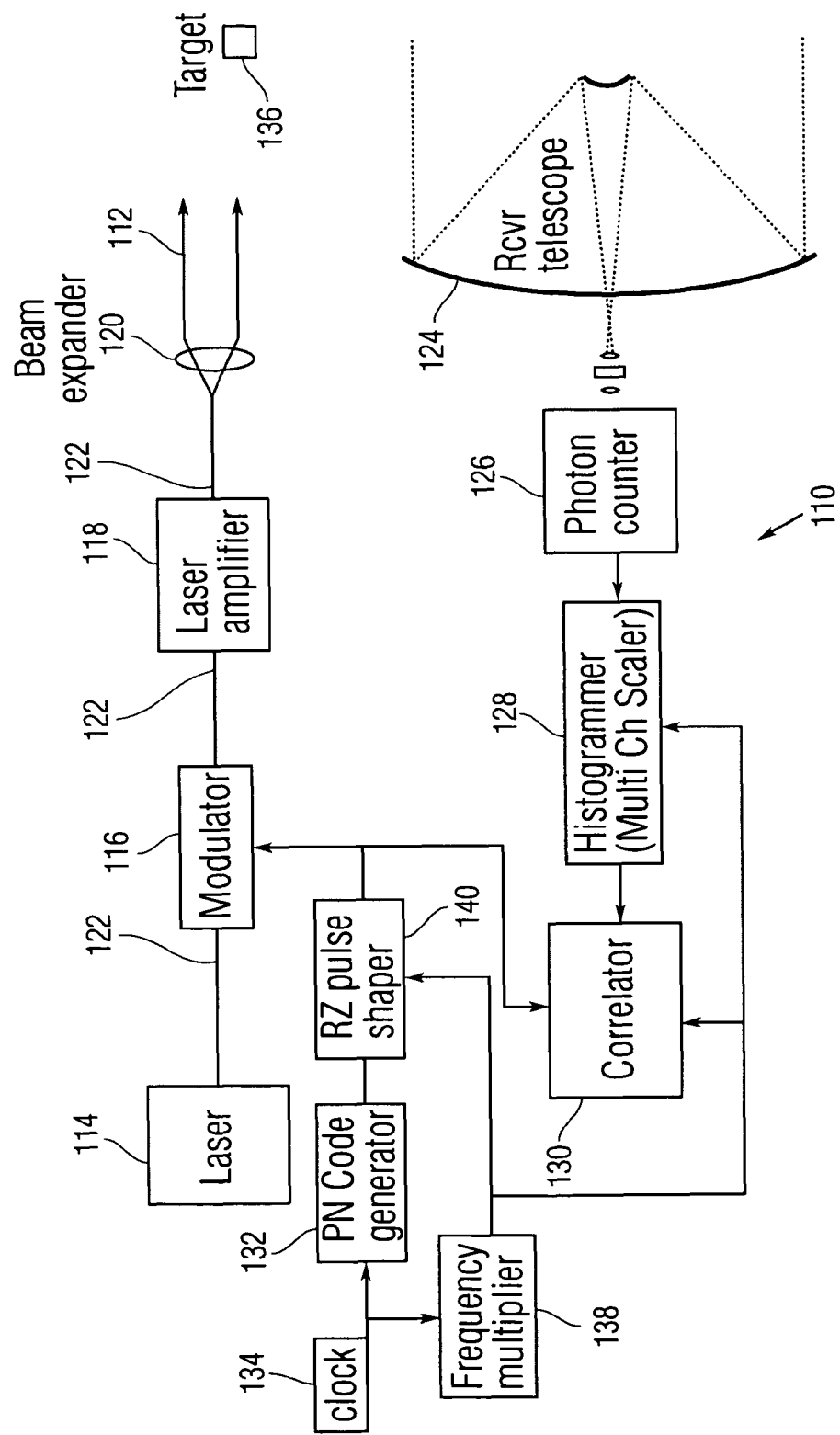
FIG. 3 is a schematic diagram of one embodiment of a time delay and distance measurement device in accordance with the invention.

FIG. 3 is a schematic diagram of one embodiment of a time delay and distance measurement device 110 in accordance with the invention. Device 110 may be in the form of a laser ranging instrument or laser altimeter. Altimeter 110 may produce an output beam 112 whose optical power may be digitally modulated by a 25% (or smaller) duty cycle PN code. The transmitting portion of altimeter 110 may include a laser 114, modulator 116, laser amplifier 118, and beam expander 120. Fiber optics 122 may be used to interconnect the transmitting portion components, or the components may use free space optics. The receiving portion of altimeter 110 may include a receiver telescope or lens 124, photon counter 126, histogrammer 128, and correlator 130.

A PN code generator 132 may be connected through a return-to-zero (RZ) pulse shaper 140 to a modulator 116 and correlator 130. A clock 134 may be connected to the PN code generator 132 and a frequency multiplier 138. The frequency multiplier 138 may be connected to the correlator 130 and the histogrammer 128. The laser ranging instrument or altimeter 110 operates similar to altimeter 10, except the PN code is RZ PN code, as will be described with reference to FIGS. 4A-4D.

Figure 4A:
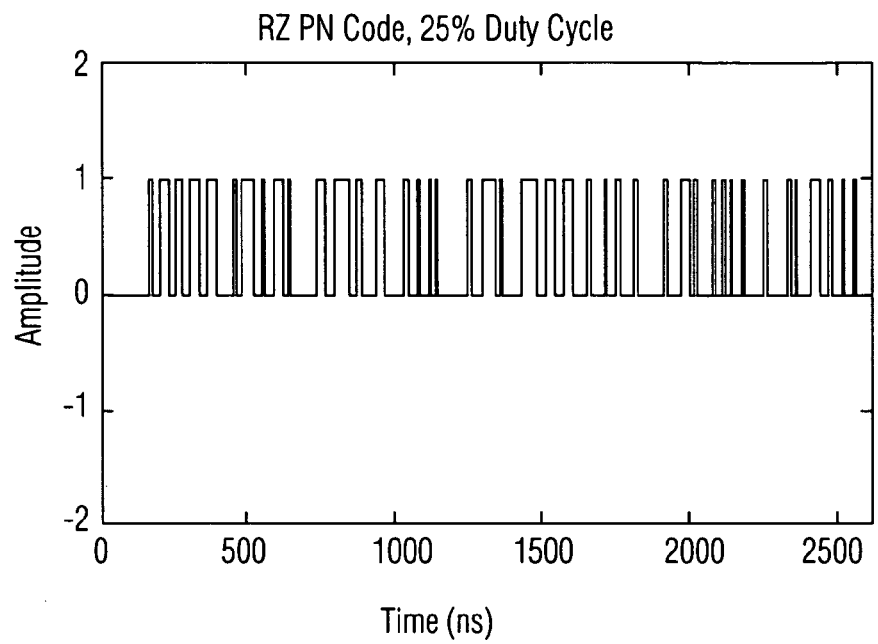
FIGS. 4A-D are waveforms for a 25% duty cycle return-to-zero PN code.
Figure 4B:
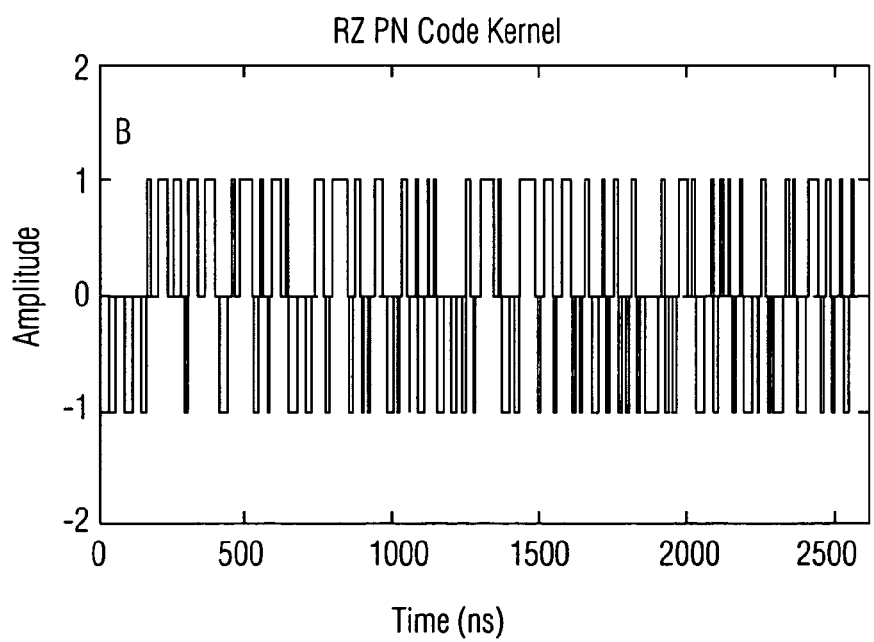

FIG. 4A shows an example of a modulation sequence for a 25% duty cycle PN code. FIG. 4E is an enlarged view of the first part of FIG. 4A. Any duty cycle less than 50% may be used. In the example, the sequence is an RZ waveform with a pulse width of 10 nsec, which is one-half of the 20 nsec bit period. FIG. 4B shows the corresponding cross correlation kernel for this code. FIG. 4F is an enlarged view of the first part of FIG. 4B. In the kernel, there is a pulse at the beginning of each bit. The pulse has a value of +1 if the RZ PN code (FIG. 4A) is a one (i.e., transmits a pulse) and a value of −1 if the RZ PN code does not transmit a pulse, and is otherwise zero. The width (10 nsec) of the pulses in the kernel is the same as the width (10 nsec) of the pulses in the modulation sequence.

Figure 4C:
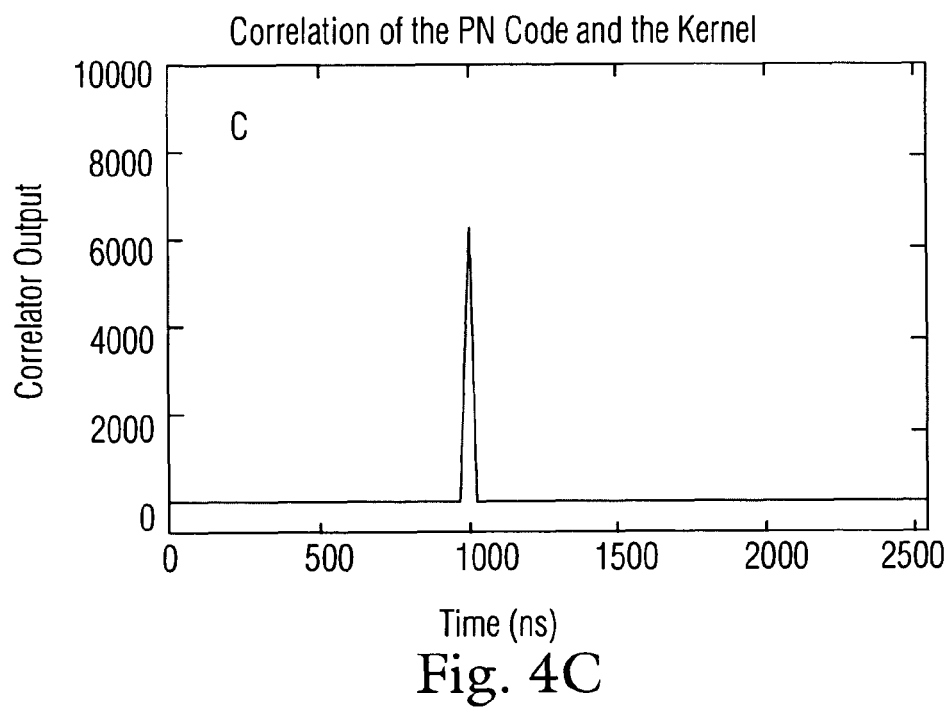
Figure 4D:
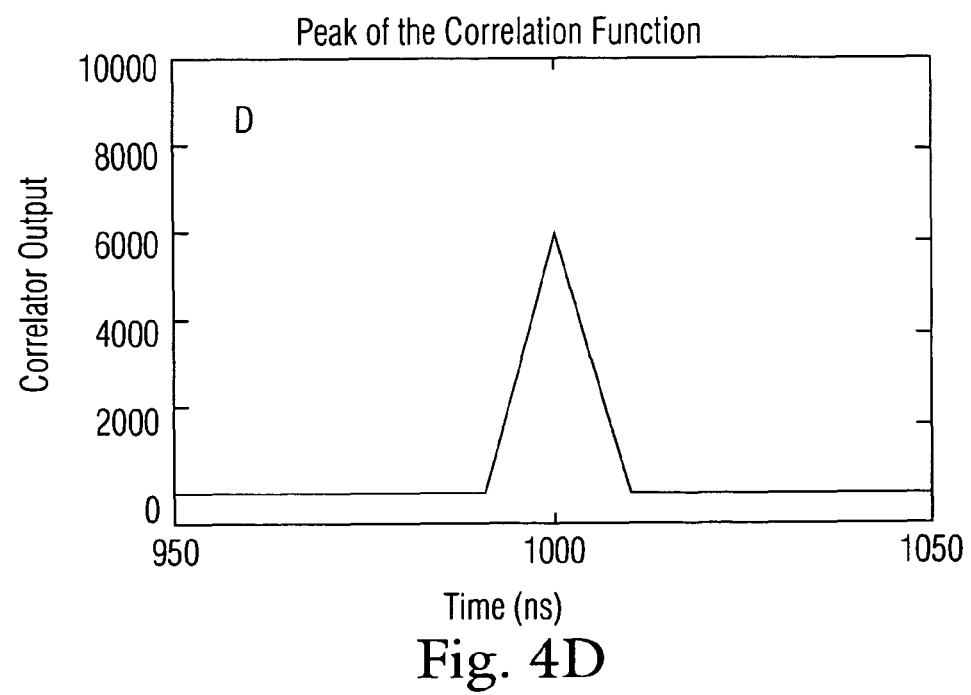
Figure 4E:
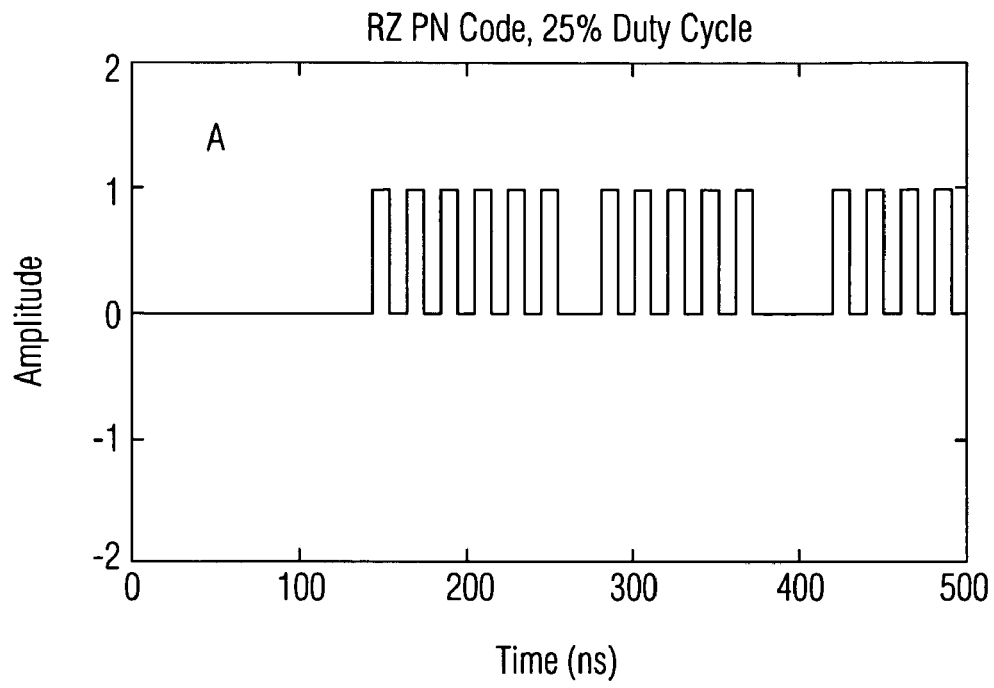
FIG. 4E is an enlarged view of the first part of FIG. 4A.
Figure 4F:
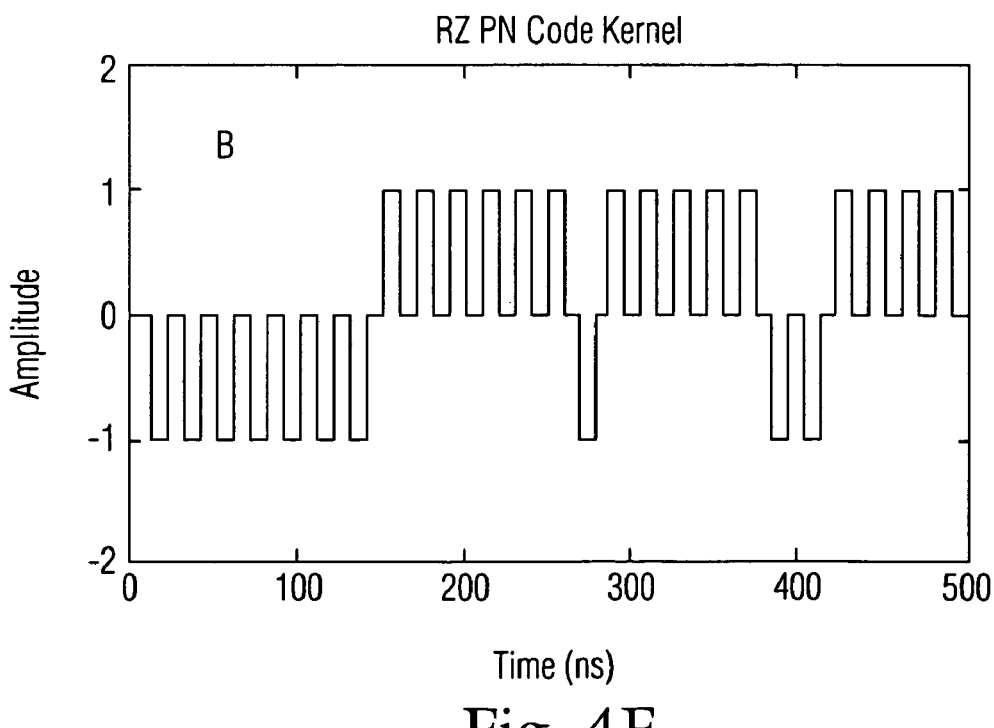
FIG. 4F is an enlarged view of the first part of FIG. 4B.

FIGS. 4C and 4D are coarse and fine views, respectively, of the cross correlation functions computed for the waveforms of FIGS. 4A and 4B. The correlation function (best seen in FIG. 4D) is triangular with a base width of 20 nsec, which is equal to twice its FWHM value of 10 nsec. The FWHM value (10 nsec) of the correlation function is equal to the width (10 nsec) of the transmitted pulse.

For the conventional 50% duty cycle PN Code, the FWHM value of the correlation function is equal to the bit width (20 nsec). However, for the 25% duty cycle code, the correlation function has an FWHM value of 10 nsec, which is one-half of the bit width. Because the FWHM value of the correlation function of the 25% duty cycle is one-half that of the conventional code, the time resolution at the receiver (at the same SNR) is improved by a factor of two.

Furthermore, the kernel of the RZ PN code may have gaps (zero values) between pulses. The gaps may result in a time gating effect in the correlation process, thereby excluding the noise pulses that coincide with the gaps. For a 25% duty cycle receiver, the gap width is equal to the pulse width, thereby reducing the contribution of optical background noise and detector dark noise to the noise variance by a factor of two, compared to a conventional PN code receiver. Smaller duty cycles may result in larger gaps and more noise reduction. Thus, the time gating effect may increase the receiver's SNR for applications where the background noise and detector noise are significant.

In many applications, the device 110 shown in FIG. 3 uses laser signals reflected from solid surfaces. However, electromagnetic radiation can also penetrate some materials. For example, optical signals of appropriate wavelengths may pass through glass, water, and air containing fog or smoke. RF and microwave signals may penetrate clouds, some walls, building materials, dry snow, sand, dry earth, etc. The time delay measurement apparatus may be applied to measurements made using surface reflections, as well as to measurements of backscatter made using transmissions that partially or completely penetrate an object or medium.

Figure 5:
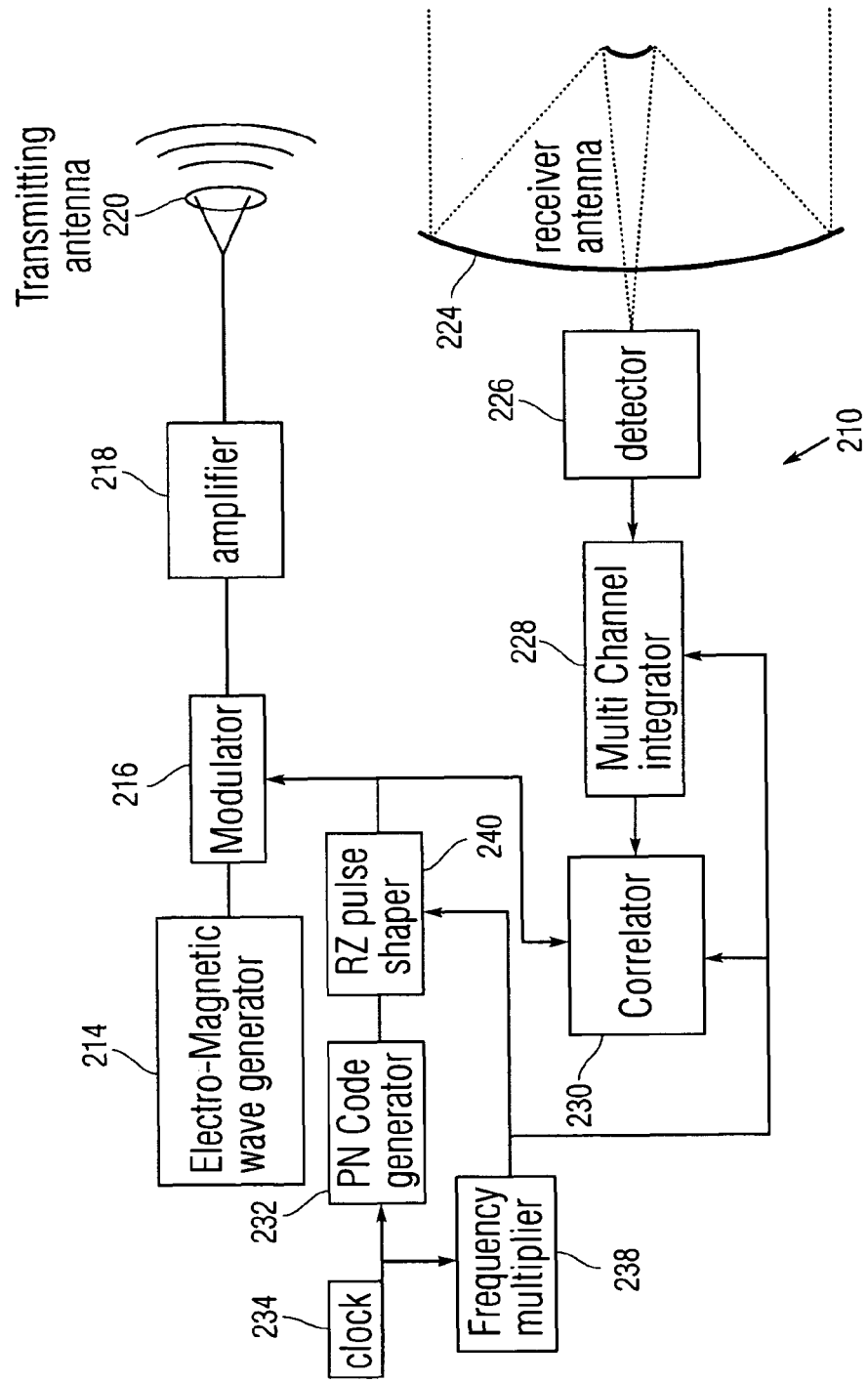
FIG. 5 is a schematic diagram of another embodiment of a time delay and distance measurement device in accordance with the invention.

The new time measurement device and method may be applied generally for measuring time delay with electromagnetic wave carrier frequencies that are lower or higher than optical frequencies. FIG. 5 is a schematic diagram of another embodiment of a time delay and distance measurement device 210 in accordance with the invention. The transmitting portion of device 210 may include an electromagnetic wave generator 214, a modulator 216, an amplifier 218, and a transmitting antenna 220. Pulsed modulation may be impressed on one or more of the amplitude, phase, frequency, polarization, or pointing angle of the carrier. The receiving portion of device 210 may include a receiver antenna 224, a detector 226 for detecting the type of modulation that is used, a sampler and multi-channel integrator 228, and a correlator 230.

A PN code generator 232 may be connected through a return-to-zero (RZ) pulse shaper 240 to a modulator 216 and correlator 230. A clock 234 may be connected to the PN code generator 232 and a frequency multiplier 238. The frequency multiplier 238 may be connected to the correlator 230 and the multi-channel integrator 228. Device 210 is similar in operation to device 110, but may use other frequencies, for example, radio frequency (RF), microwave, infrared, ultraviolet, etc., in addition to optical frequencies. The carrier frequency must be sufficiently high to have at least one cycle within the envelope of the modulating pulses.

The novel method also may also be extended to communications based on pulse timing. In optical communications, pulse position modulation (PPM) techniques may be used with pulsed laser signals to transmit information with high photon efficiency. In general, when using PPM techniques, one laser pulse may carry $\log_2(M)$ bits of information using PPM techniques, where M is the number of slots that may contain a laser pulse. One may view the time offset of the pulse within the sequence as having 1 of M values. The transmitter uses the time offset (or phase delay) of the pulse as a carrier of information. Initially, the PPM receiver is time synchronized with the transmitter by using preambles or other standard techniques.

One may also use the novel signaling method to communicate information from a transmitter to a separated receiver. Information is encoded by adjusting the time delay (i.e., phase) of a short RZ signal pulse within the longer PN code bit period. For example, suppose a short pulse laser transmitter used a PN code with a pulse width equal to $\frac{1}{16}^{th}$ of the bit period. Each $\frac{1}{16}^{th}$ of the bit period may be considered as one of M=16 slots. The transmitter may use each RZ PN code sequence to carry 4 bits of information ($\log_2(16)$) by selecting the appropriate slot number (i.e., slot or phase offset) for the laser pulse at the transmitter. The transmitter may also maintain a given phase, or slot offset, for a time interval long enough for the receiver to accumulate a minimum post-detection SNR sufficient for reliable detection. During this time, the transmitter continuously cycles through PN code sequences. One may then change the bits transmitted by changing the transmitted pulse slot's offset or transmitted phase delay.

This approach may allow reliable communication of a PPM-type signal. The advantage, compared to conventional PPM, is that the net signal energy may be spread across many smaller energy and lower peak power pulses within PN code sequences. The capability to communicate reliably with lower energy and peak power pulses is a significant advantage because many attractive lasers (such as diode lasers and fiber lasers) can produce high average power, but have peak power limitations.

One may also extend this approach to multiplex (interleave) different PN coded signals within the same bit stream, by using RZ pulses from a different PN code sequence for each slot. For example, a signal with 16 slots per bit time may allow 16 different RZ PN codes to be interleaved, with each slot time being used only for pulses of its corresponding code.

At the receiver, the corresponding kernels for each code may be used in the correlation process to recover the individual signals. Because the different PN signals are orthogonal, the correlation process for each PN signal may recover only the input PN code corresponding to a single slot. Multiplexed information may be transmitted in this way by inverting the individual PN code sequences based on input data, using code-division multiplexing, or by other standard approaches.

The RZ signal format is quite flexible and may be optimized for different applications. There is considerable flexibility in the pulse duty cycle, which may be any fraction less than 50%. The minimum practical pulse width may depend on the modulation speed of the source, the timing jitter of the transmitter, the time jitter of the detector, and the time resolution of the receiver processing system. The transmitter average power may depend on the peak power and average duty cycle capabilities of the electromagnetic radiation source.

The length of the RZ PN code is usually set to encompass the longest unambiguous time interval (or range) needed by the application. The RZ technique allows one to use short signal pulses. The short signal pulses allow high range resolution, but with an average pulse frequency equal to half the PN code bit frequency. This pulse frequency is much higher than one may obtain with simple short pulse monopulse ranging. Thus, the higher pulse frequency enabled by the RZ approach allows use of much lower peak power for the same new signal to noise ratio compared to monopulse ranging.

The receiver integration time and resulting measurement rate may depend on the needed resolution of the timing measurement, the SNR of the ranging or communications link, etc. In laser applications, the received SNR usually depends on the signal and background detected photon flux rates. For altimetry applications with strong signals, one may desire timing or range measurements every millisecond (msec) or faster. When signals are weak, it may be acceptable to integrate for a few seconds or longer to make a single range or time determination. In communication applications, the maximum communications rate also depends on the received signal and background detected photon flux rates (and hence SNR). The time needed to transmit a group of bits may vary between microseconds (for strong signals) and several seconds or more (for weak signals).

It will be apparent to those skilled in the art having regard to this disclosure that other modifications of this invention beyond those embodiments specifically described here may be made without departing from the spirit of the invention. For example, the aforementioned method may be employed to optimize the system performance by selectively choosing the transmitter duty cycle (within the range of less than 50%) to minimize the amount of power needed to transmit the PN code to achieve a given receiver SNR. Similarly by selectively choosing the transmitter duty cycle (within a range of less than 50%), the receiver SNR can be maximized for a given peak transmitter power. Accordingly, such modifications are considered within the scope of the invention as limited solely by the appended claims.

What is claimed is:

1. A method of measuring time delay, comprising:
providing an electromagnetic radiation carrier frequency;
modulating at least one of amplitude, phase, frequency, polarization, and pointing angle of the carrier frequency with a return to zero (RZ) pseudo random noise (PN) code, the RZ PN code having a constant bit period, and a pulse duration that is less than the bit period wherein said return to zero (RZ) pseudo random noise (PN) code has a duty cycle less than 50%; and
transmitting the modulated electromagnetic radiation;
detecting the modulated electromagnetic radiation;
measuring a time delay between said step of transmitting and detecting said modulated electromagnetic radiation; and
selectively choosing said duty cycle to maximize receive signal to noise ratio for a given limits in average and peak power from said step of transmitting the modulated electromagnetic radiation.

2. The method of claim 1, wherein providing an electromagnetic radiation carrier frequency includes providing an optical carrier frequency.

3. A method of measuring time delay, comprising:
providing an electromagnetic radiation carrier frequency;
modulating at least one of amplitude, phase, frequency, polarization, and pointing angle of the carrier frequency with a return to zero (RZ) pseudo random noise (PN) code, the RZ PN code having a constant bit period, and a pulse duration that is less than the bit period; and
transmitting the modulated electromagnetic radiation;
detecting the modulated electromagnetic radiation;
measuring a time delay between said step of transmitting and detecting said modulated electromagnetic radiation, said step of measuring said time delay including the steps of:
extracting modulation from the detected electromagnetic radiation;
converting a time record of the detected electromagnetic radiation into a signal processing format;
providing an RZ PN code kernel; and
computing a cross correlation function between the time record and the RZ PN code kernel;
wherein providing an RZ PN code kernel includes providing a kernel having a pulse at a beginning of each bit period wherein a value of the pulse is +1 if the RZ PN code transmits a pulse, −1 if the RZ PN code does not transmit a pulse, and zero otherwise.

4. The method of claim 3, further comprising, before receiving the modulated electromagnetic radiation, one of reflecting and scattering the electromagnetic radiation from an object.

5. The method of claim 3, wherein providing an RZ PN kernel includes providing an RZ PN kernel with a baseline of zero and pulse widths that are equal to pulse widths of the transmitted RZ PN code.

6. The method of claim 5, wherein pulse widths of the transmitted RZ IN code are constant.

7. The method according to claim 3, wherein said step of computing said cross correlation function includes computing a function representing a full signal backscatter function to thereby facilitate simultaneously measuring the time delay and associated range of multiple targets.

8. The method according to claim 7, wherein said step of detecting said modulated electromagnet radiation detects radiation reflected from a surface target.

9. The method according to claim 7, wherein said step of detecting said modulated electromagnet radiation detects radiation backscatter that has at least partially penetrated an object.

10. A method of measuring time delay, comprising:
providing an electromagnetic radiation carrier frequency;
modulating at least one of amplitude, phase, frequency, polarization, and pointing angle of the carrier frequency with a return to zero (RZ) pseudo random noise (PN) code, the RZ PN code having a constant bit period, and a pulse duration that is less than the bit period; and
transmitting the modulated electromagnetic radiation;

detecting one of scattered or reflected modulated electromagnetic radiation from an object;
measuring a time delay between said step of transmitting and detecting said modulated electromagnetic radiation, said step of measuring said time delay including the steps of:
extracting modulation from the detected electromagnetic radiation;
converting a time record of the detected electromagnetic radiation into a signal processing format;
an RZ PN code kernel; and
computing a cross correlation function between the time record and the RZ PN code kernel; wherein computing the cross correlation function includes computing a cross correlation function wherein a value at a time delay corresponds to a signal's backscatter strength at a range corresponding to the time delay.

11. The method according to claim 10, wherein said step of computing said cross correlation function includes computing a function representing a full signal backscatter function to thereby facilitate simultaneously measuring the time delay and associated range of multiple targets.

12. The method according to claim 11, wherein said step of detecting said modulated electromagnet radiation detects radiation reflected from a surface target.

13. The method according to claim 11, wherein said step of detecting said modulated electromagnet radiation detects radiation backscatter that has at least partially penetrated an object.

14. A time delay measurement device, comprising:
a transmitter to transmit a signal, said transmitter including:
an electromagnetic wave generator;
a modulator connected to the electromagnetic wave generator;
a PN code generator and RZ pulse shaper connected to the modulator, wherein the PN code generator and the RZ pulse shaper generate RZ PN code having a constant bit period and at least one pulse per bit period, the at least one pulse having a duration that is less than the bit period;
a detector to detect said signal and measure a time delay from when said signal was transmitted;
a multi-channel integrator connected to the detector; and
a correlator connected to the multi-channel integrator and to the modulator, the correlator including a kernel; wherein
the kernel includes a pulse at a beginning of each bit period wherein a value of the pulse is +1 if the RZ PN code transmits a pulse and −1 if the RZ PN code does not transmit a pulse.

15. The device of claim 14, wherein the modulator comprises an amplitude modulator.

16. The device of claim 14, wherein the modulator comprises one of a phase, frequency, polarization, and pointing angle modulator.

17. The device of claim 14, wherein the electromagnetic wave generator comprises a laser.

18. The device of claim 14, wherein the detector comprises a photon counter.

19. The device of claim 18, wherein the multi-channel integrator comprises a histogrammer.

20. The device of claim 14, wherein the electromagnetic wave generator comprises an optical frequency generator.

21. The device of claim 14, wherein pulse widths of the RZ PN code are constant.

22. The time delay measurement device according to claim 14, wherein said RZ PN code has a duty cycle less than 50%.

23. A time delay measurement device, comprising:
a transmitter to transmit a signal, said transmitter including:
an electromagnetic wave generator;
a modulator connected to the electromagnetic wave generator;
a PN code generator and RZ pulse shaper connected to the modulator, wherein the PN code generator and the RZ pulse shaper generate RZ PN code having a constant bit period and at least one pulse per bit period, the at least one pulse having a duration that is less than the bit period;
a detector to detect said signal and measure a time delay from when said signal was transmitted;
a multi-channel integrator connected to the detector; and
a correlator connected to the multi-channel integrator and to the modulator, the correlator including a kernel wherein the kernel includes pulse widths that are equal to pulse widths of the transmitted RZ PN code.

24. A method of measuring time delay, comprising:
providing an electromagnetic radiation carrier frequency;
modulating at least one of amplitude, phase, frequency, polarization, and pointing angle of the carrier frequency with a return to zero (RZ) pseudo random noise (PN) code, the RZ PN code having a constant bit period, and a pulse duration that is less than the bit period wherein said return to zero (RZ) pseudo random noise (PN) code has a duty cycle less than 50%;
transmitting the modulated electromagnetic radiation;
detecting the modulated electromagnetic radiation;
measuring a time delay between said step of transmitting and detecting said modulated electromagnetic radiation; and
selectively choosing said duty cycle to minimize an amount of average power needed for said step of transmitting the modulated electromagnetic radiation needed to achieve a given signal to noise ratio when detecting the modulated electromagnetic radiation.

25. The method according to claim 24, wherein said return to zero (RZ) pseudo random noise (PN) code has a duty cycle of about 25%.

* * * * *